United States Patent [19]

Pusch

[11] 4,264,929
[45] Apr. 28, 1981

[54] METHOD AND APPARATUS FOR SCANNING AND FOR ELECTRONIC PROCESSING OF THERMAL PICTURES

[76] Inventor: Günter Pusch, Bannholzweg 12, 6903 Neckargemünd-Dilsberg, Fed. Rep. of Germany

[21] Appl. No.: 710,644

[22] Filed: Feb. 17, 1978

[30] Foreign Application Priority Data

Aug. 2, 1975 [DE] Fed. Rep. of Germany ....... 2534586

[51] Int. Cl.³ .................... H04N 3/02; H04N 3/12; H04M 5/33
[52] U.S. Cl. .................... 358/199; 358/113; 358/212
[58] Field of Search ............. 358/199, 285, 113, 212, 358/213, 294

[56] References Cited

U.S. PATENT DOCUMENTS 3,941,923  3/1976  Wheeler ............................ 358/113

OTHER PUBLICATIONS

Anderson, "T.V.-Compatible Forward Looking Infrared", Optical Engineering, vol. 13, No. 4, 7-74, pp. 335-338.

Primary Examiner—Robert L. Griffin
Assistant Examiner—Edward L. Coles
Attorney, Agent, or Firm—Haseltine and Lake

[57] ABSTRACT

Scanning speed at right angles to scanning line direction becomes so selected that every line becomes scanned anew by way of the following element in picture direction. Reproduction is carried out by way of a series arrangement of luminous diodes. The luminous diodes are arranged geometrically as to the detector arrangement. For scanning the thermal picture, there becomes used a polygon prism permeable for thermal radiation and beams and for reproduction there becomes used a polygon prism permeable for visible radiation or beams. Both prisms are located on the same pivot axis and the scanning of the thermal picture, as well as the reproduction of the visible picture in line direction occurs by way of turning both polygons and scanning in picture direction occurs by tilting of the pivot axis.

12 Claims, 8 Drawing Figures

METHOD AND APPARATUS FOR SCANNING AND FOR ELECTRONIC PROCESSING OF THERMAL PICTURES

The present invention relates to a method and an apparatus for scanning and electronic processing of thermal pictures subject to utilizing a multi-element series detector arranged at right angles to the line device. The foregoing is characterized thereby that every line of the thermal picture becomes scanned by way of the individual elements and the corresponding lines become superimposed in the reproduction.

If, for example a picture consists of 100 lines and the detector consists of 10 elements, so during the first scanning procedure the element 1 scans the line 1, the element 2 scans the line 2 and so forth and the element 10 scans the line 10. During the next scaning procedure, the element 1 scans the line 2, the element 2 scans the line 3 and the element 10 scans the line 11 and so forth. From line 10 on accordingly, all subsequent lines as far as to the line 90 become scanned ten times while the lines 9 and 91 become scanned nine times and the lines 2 and 92 become scanned eight times and so forth until reaching the lines 1 and 100 which become scanned only once.

This means on the other hand that the middle lines 10 through 90 when they become superimposed in the reproduction and become received by a storage receiver, as for example the human eye, then the signal is amplified by a factor of 10 while the noise which is not correlated with the signal increases only with the root out of 10.

Hereby there is an inventive characteristic feature that the scanning speed becomes selected at right angles to the line direction so that every line becomes scanned anew by way of the following element in picture direction. If now the scanning in picture direction is made slower, so also the intermediate spacing of the detector elements become covered during the following line scanning procedure. Hereby there arises the decisive advantage that the line structure of the picture disappears extensively.

According to a further concept of the present invention, the reproduction becomes carried out through a series arrangement of luminous diodes whereby every detector element has a luminous diode arranged therewith that becomes supplied or energized by way of a corresponding amplifier arrangement. Inventively, the luminous diode arrangement of the detector arrangement should be arranged geometrically; accordingly, the relationship of luminous diode surface to the intermediate spaces should be the same as the surface of the detector elements to the pertaining intermediate spaces.

If now the delivery sections or starting points of the detector elements are connected parallel, so simultaneously several luminous diodes are supplied or energized parallel with the integral signal voltage; this means that the geometric resolving becomes reduced considerably and essentially though the thermal sensitivity rises correspondingly. By way of this measure the geometric resolving can accordingly be interchanged with respect to the thermal resolving and the picture can be processed optimally respectively according to the structure thereof.

While during the interconnection of several elements, there occurs a resolving reduction only in picture direction and thereby there occurs an increase of the thermal sensitivity, there can be attained in line direction the same when the electronic band width of the subsequent amplifier becomes correspondingly reduced in size or magnitude. If for example, three detector elements are combined, so there will result a reduction of the electronic band width to one-third having the same effect with respect to resolving and thermal sensitivity in line direction.

The apparatus in realization of the inventive method can for example, consist thereof that for scanning the thermal picture there is provided a polygon prism permeable for thermal radiation or beams and for reproduction there becomes used a polygon prism permeable for visible radiation or beams whereby both prisms are located upon the same rotary axis and the scanning of the thermal picture, as well as the reproduction of the visible picture in line direction occurs by way of rotating both polygons and scanning in picture direction by way of tilting of the pivot or rotating axis.

If the observation of the diode series by way of a corresponding eyepiece for the human eye, so there is provided a positive synchronizing of the thermal and visible picture because of the common pivot or rotary axis of both polygons; there appears accordingly a stationary picture accordingly independent of the number of turns and tilt frequency.

According to a further concept of the invention, the features of the luminous diode arrangement can also be projected upon the cathode of a television receiver tube, for example, a Vidicon of which the target has storage characteristics. Then a storing of the lines upon the target occurs independent of the scanning frequency of the scanning-electron beam or radiation of the television receiver tube; this means the aforementioned improvement of signal-noise relationship arises.

Since the human eye is in a position to receive only 10 through 20 contrast steps in a predetermined adaptation condition and a thermal picture normally in essence has higher contrast scope, a thermal picture can transmit an essentially higher information content when the amplitude range of the thermal video signal becomes subdivided into several parts or regions and a color becomes provided in every part or region thereof. This is inventively possible thereby that every part-amplitude region has a luminous diode arrangement provided therewith and every luminous diode arrangement projects a corresponding picture upon the cathode of a television receiver tube. If for example, three television receiver tubes are provided for the basic colors of red, green and blue, so for example the luminous diode arrangement which supplies "green" as to the television receiver tube can transmit the small thermal signal amplitudes; the luminous diode arrangement which supplies "blue" as to the television receiver tube can transmit the middle thermal signal amplitudes; and the luminous diode arrangement which supplies "red" as to the television receiver tube can transmit the large thermal signal voltages. This can be effected by way of simple threshold value switches at the output of the electronic amplifier. Hereby there is not necessary that the luminous diode arrangements themselves give off different colors; decisive is that the video signals of the three television receiver tubes supply the color channels or passages with green, blue and red of a color monitor. With such an apparatus, there becomes inventively possible that the lines and picture scanning of the thermal picture occurs with a considerably smaller number of lines and scanning speed than the picture scanning in the television receiver tube whereby the television receiver tube means can become scanned with the conventional television, normal of for example, 625 lines and 25 picture changes. Because of the storage effect of the target in the television receiver tube, there does not arise hereby any reduction of the original thermal and geometric resolving of the heat picture.

It is, of course, to be understood that the present invention is by no means, limited to the specific showing in the drawing, but also comprises any modification within the scope of the appended claims.

BRIEF DESCRIPTION OF THE DRAWINGS

FIG. 3 and FIGS. 3a–c are diagrams of the scanning scheme used in the invention.

DESCRIPTION OF THE PREFERRED EMBODIMENTS

The number of elements in the example is 6; it is unlimited as far as electronics is concerned.

Figure 1:
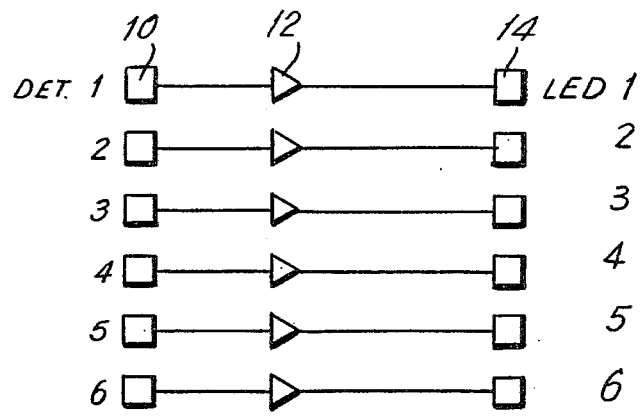
FIG. 1 is a schematic diagram of a thermal detector and signal amplifying system useful in the present invention.

FIG. 1 shows operating mode I where each detector controls its own preamplifier and the latter is an LED which is thus associated with only one detector element. This circuit achieves maximum geometric resolution.

Figure 2:
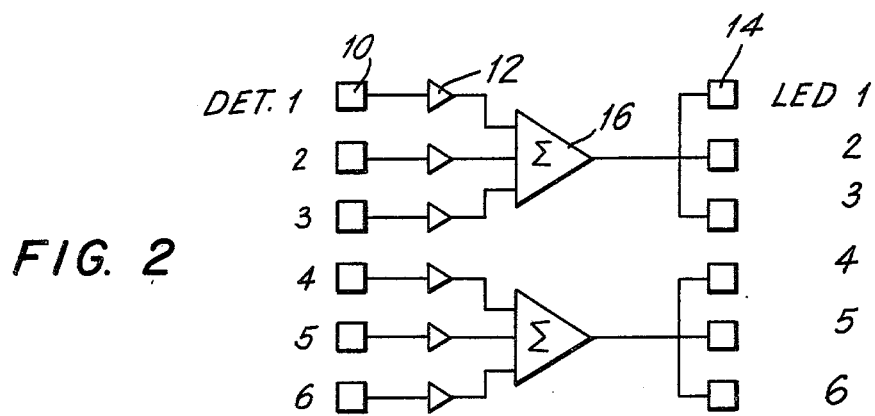
FIG. 2 is an alternate system.

FIG. 2 shows the mode II which results from automatic switching from mode I or acts simultaneously on a second LED array from the same detector array. Here also, it is an example from among many possibilities. Of 6 detectors of a detector array, 3 each are combined and connected to a summing amplifier whose bandwidth is reduced to $\frac{1}{3}$ that of the preamplifier. This narrow-band amplifier controls 3 LEDs in parallel. In this mode, by electronic enlargement of the effective detector area and the simultaneous enlargement of the display luminous dots and the reduction of the amplifier bandwidth to $\frac{1}{3}$, the thermal resolution is increased with simultaneous deterioration of the geometric resolution. The limiting case for the operating mode II is the parallel connection of all elements of a detector array.

Figure 3:
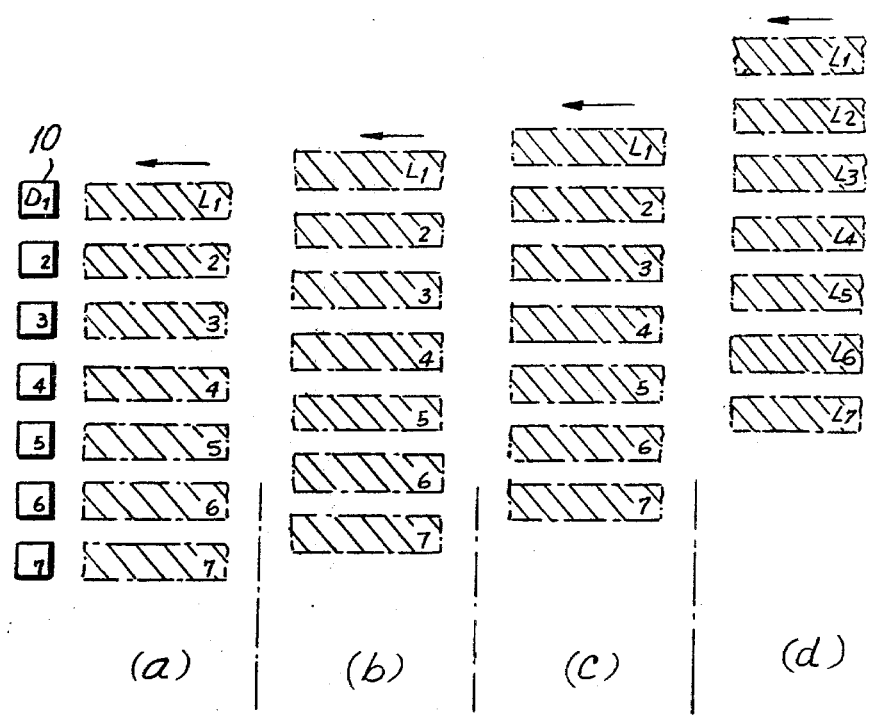
Figure 5:
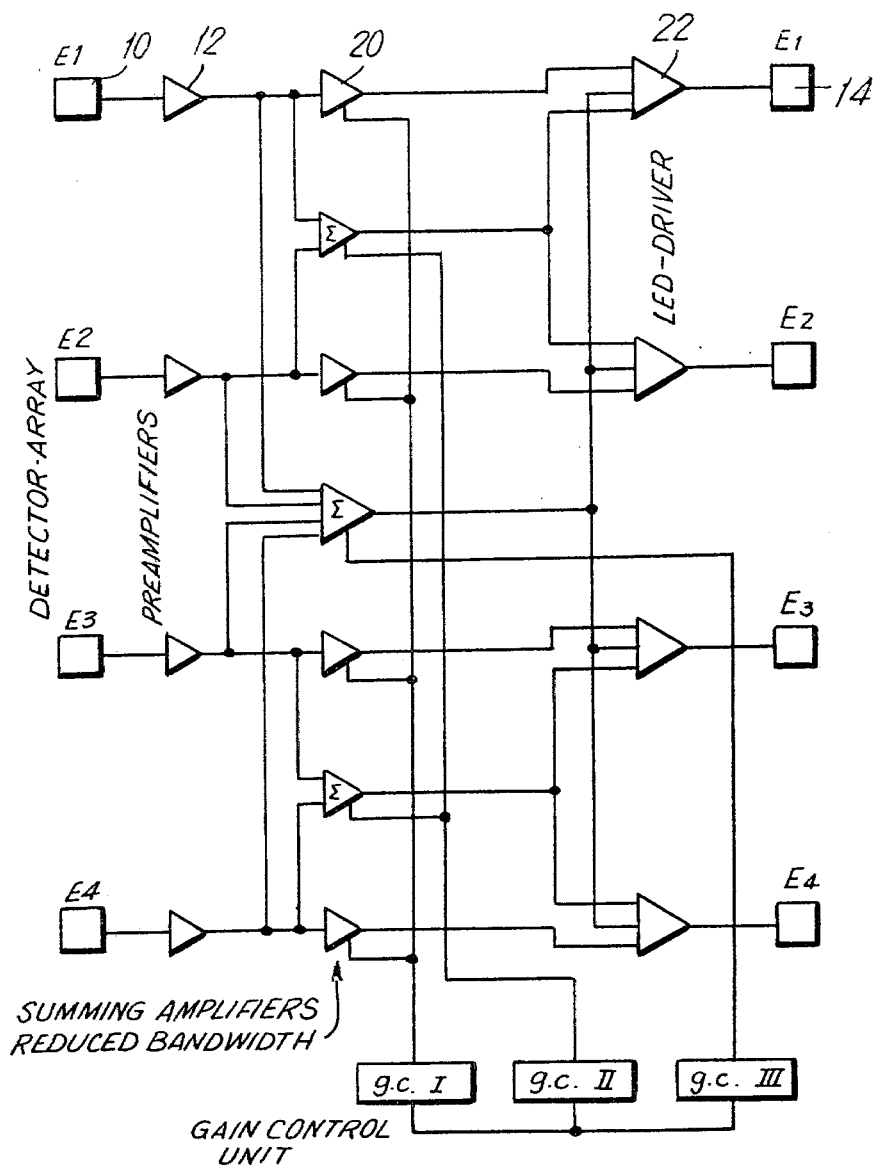
FIG. 5 is a schematically alternate system.

FIG. 3 illustrates the manner of how the thermal image is scanned by lines by a detector array; after scanning the first line, the image is shifted by only 4/5 of the width of a line (for example, by a tilting mirror). Then detector 1, during its second scan (FIG. 3a), once more scans part of line 1, plus the intermediate space between line 1 and line 2 plus a portion of line 2 (L2) from the first run-through (scan). The same jump takes place with the third run-through (FIG. 3b) so that the traces made by the detector array on the thermal image overlap repeatedly (for example, for a detector with 100 elements 90 times on the average).

Accordingly, differences in the quality of the individual elements of a detector array are averaged out. Also, the line structure disappears from the display screen.

In this example, FIG. 3c corresponds to the 6th run-through (scan).

In summary, two modes of operation are described. Mode 1 is shown in FIG. 1. One element each of a detector array E 1 to 6 is connected via a preamplifier with an element of an LED 1 to 6.

It is described in further detail how a preamplifier for an infrared detector is connected internally. Standard components that are commercially available, for this purpose, are ratherly obtained from such manufacturers as Mullard, Southampton or Plessy Semiconductors, Swindon.

Mode II is described in FIG. 2. Here the outputs of a group of three preamplifiers are connected to the inputs of a summing amplifier whose bandwidth is reduced to one-third. The output of each summing amplifier feeds three elements of the LED array 1 to 6. Switching from Mode I to Mode II is done either by switching (the type of switches are trivial) or two different color LED arrays are used simultaneously. FIG. 3 shows the schematic.

As described in the application, there are possible not only two modes of operation, but rather 3,4,5 or more depending on the number of elements of the detector array or they may be operated in parallel. For example, with a 32-element detector, the following modes are possible:

Mode I: each detector element feeds one LED element

Mode II: 2 detector elements each feed 2 LED elements each

Mode III: 4 detector elements each feed 4 LED elements

Mode IV: 8 detector elements each feed 8 LED elements

Mode V: 16 detector elements each feed 16 LED elements

Mode VI: all 32 detector elements feed all 32 LED elements in parallel.

The transition from one mode to another may be achieved by electronic switching. But it can also be accomplished by making a separate LED array available for each mode.

Figure 4:
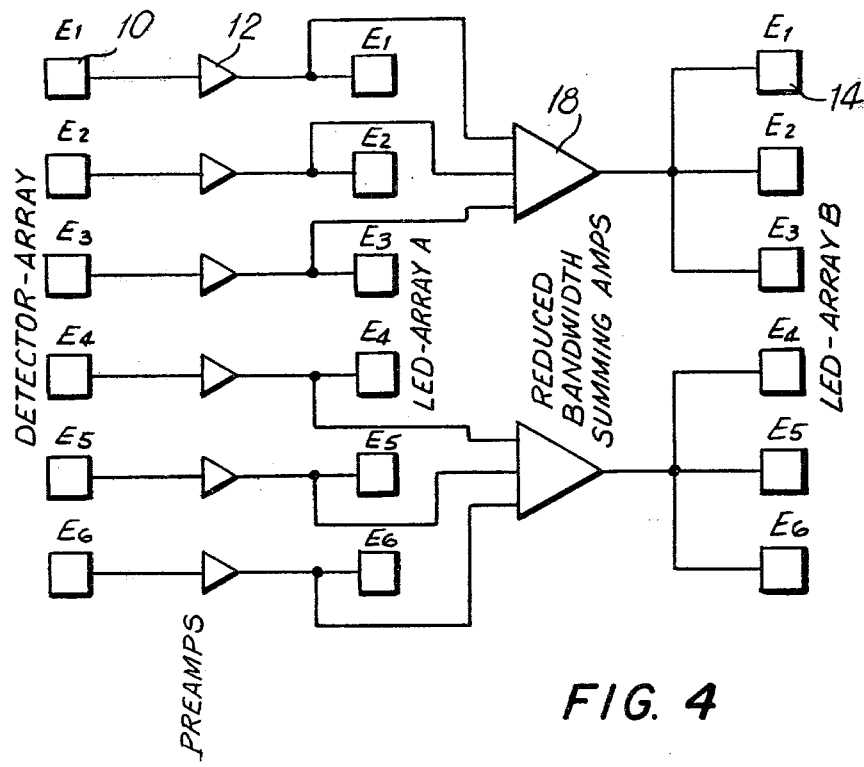
FIG. 4 is a schematic of a hybrid system similar to the system of FIGS. 1 and 2.

Finally, transition of modes may be accomplished by feeding each element of the LED array with a summing amplifier which simultaneously receives the signals from all amplifiers of Mode I to VI. Switching from one mode to the next is achieved by regulating the gain in the narrow-band amplifiers. Thus the transition can be made continuous, FIG. 4 shows an example of a 4-element detector and 3 modes.

The pure mode I is provided by setting g.c.I=1; g.cII=0; g..c. III=0.

Pure mode II by g.c.I=0; g.c.II=1; g.c.III=0; etc.

The units for the gain regulation (g.c.I tp III) are controlled jointly.

One feature of the present invention is that the control for the switching from one mode to next takes place simultaneously with the radial scanning of the thermal situation. As a result, in the polar scanning, the advantage of mode I, high geometric resolution, is always used in the center of the image. The advantage of high thermal resolution with low geometric resolution, on the other hand, is always on the edge of the image.

Figure 6:
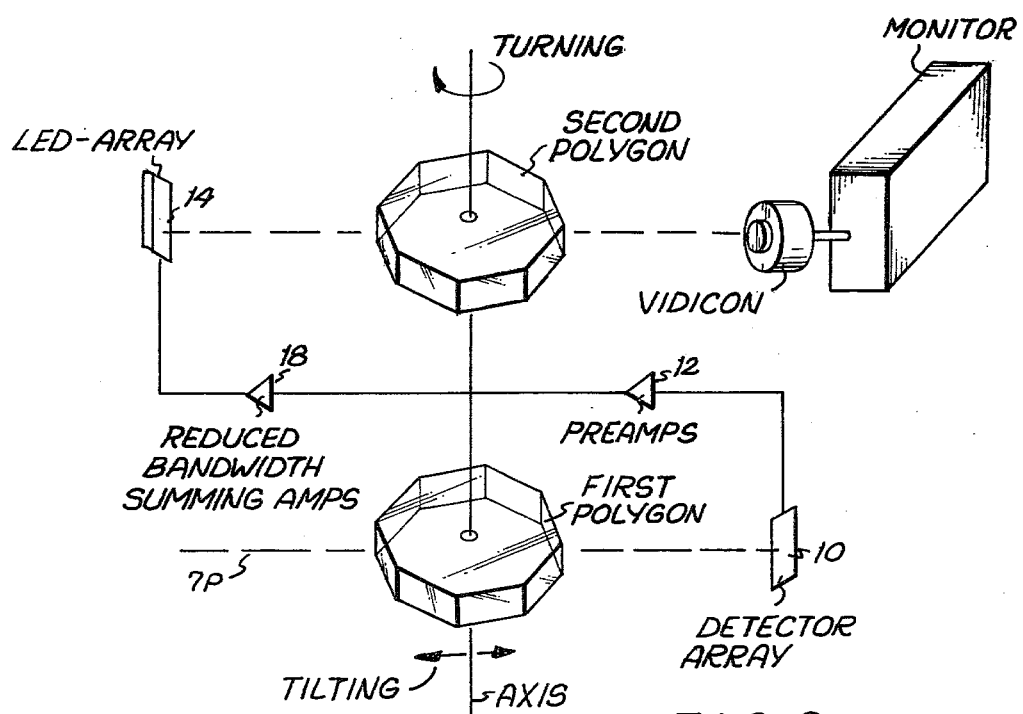

FIG. 6 is a schematic view for a scanning and electronic processing arrangement in which scanning occurs in line direction by turning of a polygon prism and scanning in picture direction occurs by tilting of a rotary axis, according to the present invention.

What is claimed is:

1. A process for scanning and electronic processing without delay intervals to produce thermal images of a field of view comprising the steps of: disposing a single detector line perpendicular to a line scanning direction; displacing each scan in the line scanning direction in a direction perpendicular to the line scanning direction relative to the preceding scan; scanning each line of the field of view a plurality of times by respective detector elements; and superimposing in the reproduction respective images of a line formed by a plurality of scans, said electronic processing being free of said delay intervals due to arrangement of said detector line perpendicular to a line scanning direction.

2. A process as defined in claim 13 including the step of selecting the scanning speed in a direction perpendicular to the line scanning direction to scan each line in a renewed manner by the succeeding element in the array for obtaining substantially 100% overscan.

3. A process as defined in claim 1 including the step of selecting the scanning speed in the direction perpendicular to the line scanning direction to cover the intervening spacing between the detector elements through the succeeding line scanning steps.

4. A process as defined in claim 1 including the steps of: reproducing through a linear array of light-emitting diodes, coupling each detector element to an associated light emitting diode through an electronic amplifier.

5. A process as defined in claim 1 including the step of: connecting the outputs of a plurality of detector elements and subsequent amplifiers in parallel.

6. A process as defined in claim 5 including the step of: diminishing the electronic bandwidth in conjunction with parallel connection of the detector elements.

7. An apparatus for scanning and electronic processing to produce thermal images of a field of view comprising: a linear array of detector elements perpendicular to a line scanning direction; each scan in the line scanning direction being displaced in a direction perpendicular to the line scanning direction relative to the preceding scan; each line of the field of view being scanned a plurality of times by respective detector elements, respective images of a line formed by a plurality of scans being superimposed in the reproduction; a polygonal prism transparent to thermal radiation for scanning the thermal image; a polygonal prism transparent to visible radiation for reproduction; both said prisms being located on one rotational axis, scanning in the line scanning direction being obtained through rotation of said polygonal prisms, and scanning in a perpendicular direction through tilting of said rotational axis; said apparatus being free of couplings via delay elements due to arrangement of said detector elements perpendicular to a line scanning direction.

8. An apparatus as defined in claim 7 including a light-emitting diode array connected to said detector elements, and a television camera tube in form of a vidicon and having a cathode upon which a picture of said light-emitting diode array is projected free of any thermal image.

9. An apparatus as defined in claim 8 wherein said television camera tube has target means with storage characteristics.

10. An apparatus as defined in claim 7 wherein the thermal video signal has an amplitude range subdivided into a plurality of partial ranges, each partial range having a respective light-emitting diode array and each light-emitting diode array projecting a corresponding image upon said cathode of said television camera tube, said light-emitting diode array having a configuration independent of the arrangement of said detector elements.

11. An apparatus as defined in claim 10 including color television monitor means; and further television camera tubes supplying video signals as color signals to said television monitor means.

12. An apparatus as defined in claim 10 wherein line scanning and picture scanning of a thermal picture occur with a substantially smaller number of lines and a smaller scanning speed than applied with picture scanning in the television camera tubes scanned according to television standards.

* * * * *